(12) United States Patent
Hitzschke et al.

(10) Patent No.: US 7,278,757 B2
(45) Date of Patent: Oct. 9, 2007

(54) ILLUMINATION SYSTEM HAVING A HOUSING AND A FLAT LAMP ARRANGED THEREIN

(75) Inventors: Lothar Hitzschke, Munich (DE); Frank Vollkommer, Buchendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 240 days.

(21) Appl. No.: 11/127,115

(22) Filed: May 12, 2005

(65) Prior Publication Data

US 2005/0259445 A1 Nov. 24, 2005

(30) Foreign Application Priority Data

May 19, 2004 (DE) ............... 10 2004 025 266

(51) Int. Cl.
*H01J 1/62* (2006.01)
(52) U.S. Cl. ............... 362/263; 313/234; 313/485; 313/493; 313/607
(58) Field of Classification Search ........... 362/235, 362/263, 260; 313/234, 607, 485, 492, 493, 313/495; 349/65
See application file for complete search history.

(56) References Cited

U.S. PATENT DOCUMENTS

| | | | |
|---|---|---|---|
| 5,604,410 A | 2/1997 | Vollkommer et al. | |
| 5,994,849 A | 11/1999 | Vollkommer et al. | |
| 6,034,470 A | 3/2000 | Vollkommer et al. | ....... 313/485 |
| 6,336,728 B1* | 1/2002 | Deloy | ............ 362/614 |
| 6,538,556 B1* | 3/2003 | Kawajiri | ............ 340/3.2 |
| 2002/0063514 A1 | 5/2002 | Oishi et al. | ............ 313/495 |
| 2002/0154258 A1 | 10/2002 | Fujishiro et al. | ............ 349/70 |
| 2003/0234896 A1* | 12/2003 | Kim | ............ 349/65 |
| 2004/0046490 A1 | 3/2004 | Doll | ............ 313/485 |
| 2004/0114345 A1* | 6/2004 | Kim et al. | ............ 362/31 |

FOREIGN PATENT DOCUMENTS

WO    WO 03/017312    2/2003

* cited by examiner

*Primary Examiner*—Thomas M. Sember
(74) *Attorney, Agent, or Firm*—Robert F. Clark

(57) ABSTRACT

An illumination system for backlighting liquid crystal displays has a flat lamp, which has a front side provided for emitting the light and a rear side opposite the front side, a flat housing having a planar rear wall and four side walls, the flat lamp being arranged within the housing on the rear wall, and a frame that at least partially surrounds the side walls of the housing and extends at least up to the edge of the flat lamp.

13 Claims, 3 Drawing Sheets

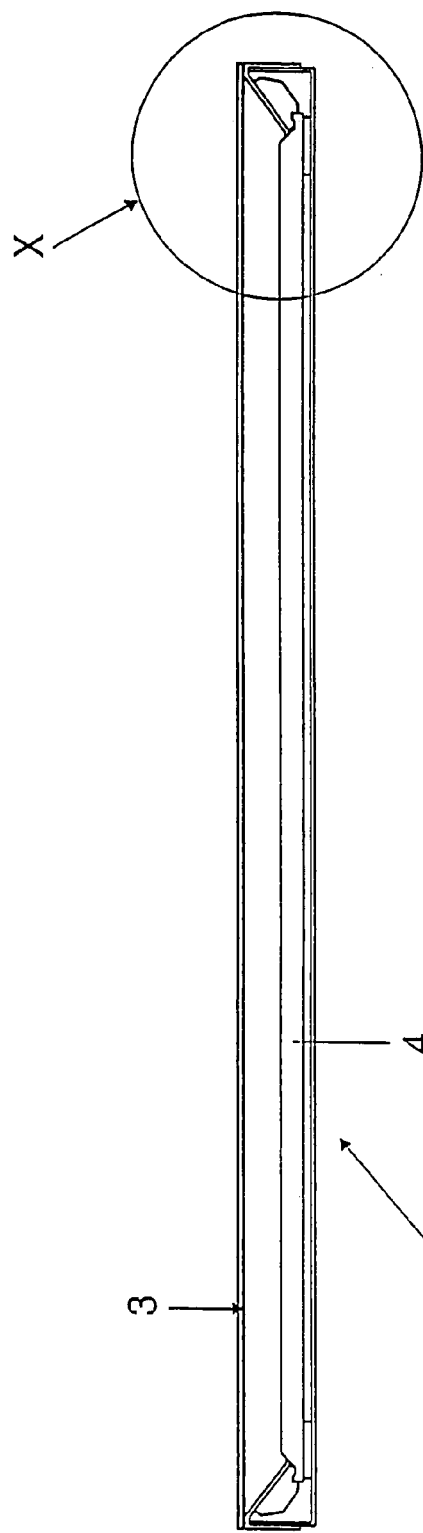
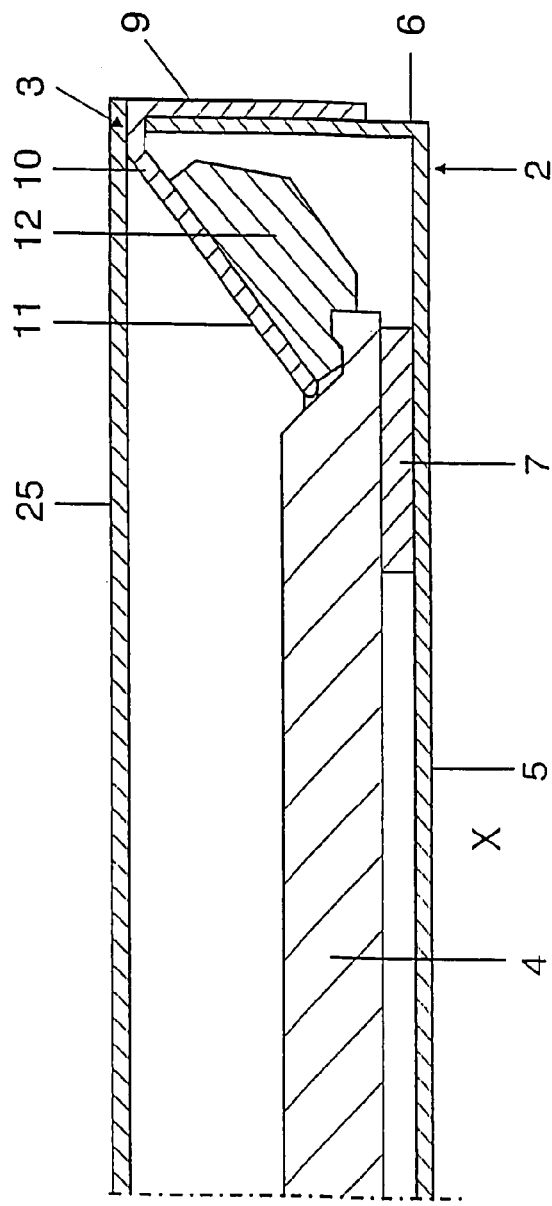
FIG 1b
FIG 1c

ILLUMINATION SYSTEM HAVING A HOUSING AND A FLAT LAMP ARRANGED THEREIN

TECHNICAL FIELD

The invention is based on an illumination system having a housing and a flat lamp arranged therein. Such illumination systems are used as so-called light boxes for a large variety of illumination tasks, in particular also for backlighting liquid crystal displays (LCDs), also referred to in this case as backlight units, and as a luminaire in general illumination. An example of backlighting tasks is, in particular, large-format LCD televisions, which in recent times have increased in popularity.

The term "flat lamp" in this case refers to lamps, in particular fluorescent lamps, having a flat geometry, which emit white or colored light and, for special applications, also UV light.

In addition to conventional flat lamps with mercury and/or a noble-gas filling, the invention is concerned with, in particular, flat lamps of the dielectric barrier discharge lamp type having strip-like or linear electrodes, which are typically arranged on one or on two opposing walls of the flat discharge vessel. In addition, either the electrodes of one polarity or else all of the electrodes, i.e. of both polarities, are separated from the discharge by means of a dielectric layer (dielectrically impeded discharge on one or two sides).

Such electrodes will also be referred to below for short as "dielectric electrodes". In addition, it should also be clarified that the dielectric layer does not have to be a layer which is applied to an electrode specifically for this purpose, but may also be formed, for example, by a discharge vessel wall if electrodes are arranged on the outer side of a discharge vessel wall or within the wall.

Flat lamps of the dielectric barrier discharge lamp type have proved to be particularly efficient flat light sources if they are operated using the pulsed operating method described in U.S. Pat. No. 5,604,410, and are therefore particularly well suited for use in a light box or a backlight unit.

BACKGROUND ART

U.S. Pat. No. 6,034,470 B1 discloses a flat lamp having electrode tracks arranged on the inner side of a discharge vessel wall, which is installed for the purpose of backlighting an LCD monitor in a common housing (see FIG. 7). However, no details are given on fixing the flat lamp within the housing. It can merely be seen in FIG. 7 that the flat lamp is, as it were, "clamped in" between the side walls of the housing at a certain spacing from the rear wall of said housing. A general problem in the case of backlighting LCDs consists in the fact that flat lamps produce, during operation, undesirable heat emissions, but the LCDs are relatively sensitive to high temperatures, which makes necessary correspondingly effective thermal management. For this purpose, U.S. Pat. No. 6,034,470 B1 proposes attaching a cooling body to the outer side of the rear wall of the housing. However, no details are given on the transportation of heat from the flat lamp to the housing rear wall.

DISCLOSURE OF THE INVENTION

The object of the present invention is to provide an illumination system, which is improved as regards the thermal properties, having a housing and a flat lamp arranged therein. A further aspect is the desire to achieve a design which is as simple as possible and thus as cost-effective as possible and which ensures reliable fixing of the flat lamp within the housing such that it is secure against breakage.

This object is achieved by an illumination system, in particular for backlighting liquid crystal displays, having a flat lamp, which has a front side, provided for emitting the light, and a rear side opposite said front side, a flat housing having a planar rear wall and four side walls, the flat lamp being arranged within the housing on the rear wall, and a frame, which, on the one hand, at least partially surrounds the side walls of the housing and, on the other hand, extends at least up to the edge of the flat lamp.

In order to achieve dissipation of the heat produced during operation of the flat lamp which is as effective as possible, it has proved to be advantageous to fix the flat lamp directly on the inner side of the thermally conductive, for example metallic, rear wall of the housing or to merely arrange a thin, elastic bearing between the rear side of the flat lamp and the rear wall of the housing. For this purpose, preferably double-sided adhesive strips are used, since the flat lamp is thus already fixed in the housing with respect to the two directions of oscillation, i.e. both in the direction toward the rear wall and also away from said rear wall. In this context, a support for the lamp which is as flat as possible is also advantageous, the thin, elastic bearing, however, not necessarily needing to be integral, but it also being possible, for example, for it to be realized by means of a plurality of strips or sections having any other form. It is critical to prevent the flat lamp from sagging or from swinging back and forth, for example on transportation, and to prevent the stress forces associated therewith, which may lead, in an unfavorable case, to breakage of the flat lamp. Any acceleration forces acting on the flat lamp are thus distributed over larger areas and are markedly damped. A plurality of double-sided adhesive strips are preferably arranged parallel to one or to both of the side edges of the rear side of the flat lamp such that they are evenly distributed, with the result that the adhesive strips divide the area between the rear side of the flat lamp and the rear wall of the housing into a plurality of imaginary flat chambers of equal size. The object of this measure is to suppress, in particular when the flat lamp has a vertical position during operation, convection in the space between the rear side of the flat lamp and the rear wall of the housing in order to ensure a temperature profile along the rear side of the flat lamp which is as homogeneous as possible. This can be achieved by suitably small chambers, i.e. finally by a sufficient number of evenly distributed double-sided adhesive strips.

In order to further improve heat dissipation, it may be advantageous to blacken the outer side of the rear wall of the housing in order to thus increase the emission coefficient.

Although, in principle, merely fixing the flat lamp to the rear wall of the housing as described above is possible and is generally also sufficient, it may optionally be advantageous to provide supplementary fixing of the flat lamp by means of the frame. For this purpose, the frame is designed such that it slightly overlaps the edge of the flat lamp. As a result, the ingress of dust, moisture, etc. into the housing can also be prevented. In addition, it may be advantageous to provide an elastic strip, for example made of cellular rubber, between the frame and the edge of the flat lamp, and this fixes the flat lamp, for example by means of an interlocking connection, and at the same time compensates for possible stress forces and thus reduces the risk of breakage for the flat lamp.

In addition, the frame is preferably formed such that it has a peripheral surface, which adjoins the edge of the front side of the flat lamp, is designed as a reflector, in particular for visible light, and is inclined toward the front side of the flat lamp.

For the case in which the flat lamp used is provided with linear outer electrodes fitted to its rear side, the rear side of the flat lamp including the linear outer electrodes must be covered by an electrically insulating protective layer in order to prevent an electrical short circuit between the outer electrodes and the rear wall. Alternatively, the outer electrodes can be integrated in a foil-like laminate, which already comprises such a protective layer. For further details, reference is made to the exemplary embodiment.

BRIEF DESCRIPTION OF THE DRAWINGS

The invention will be explained in more detail below with reference to an exemplary embodiment. In the drawings:

FIG. 1b shows a cross-sectional illustration through the illumination system shown in FIG. 1a along the line AA, FIG. 1c shows an enlarged view of the detail X of the cross-sectional illustration of the illumination system shown in FIG. 1b.

BEST MODE FOR CARRYING OUT THE INVENTION

Figure 1A:
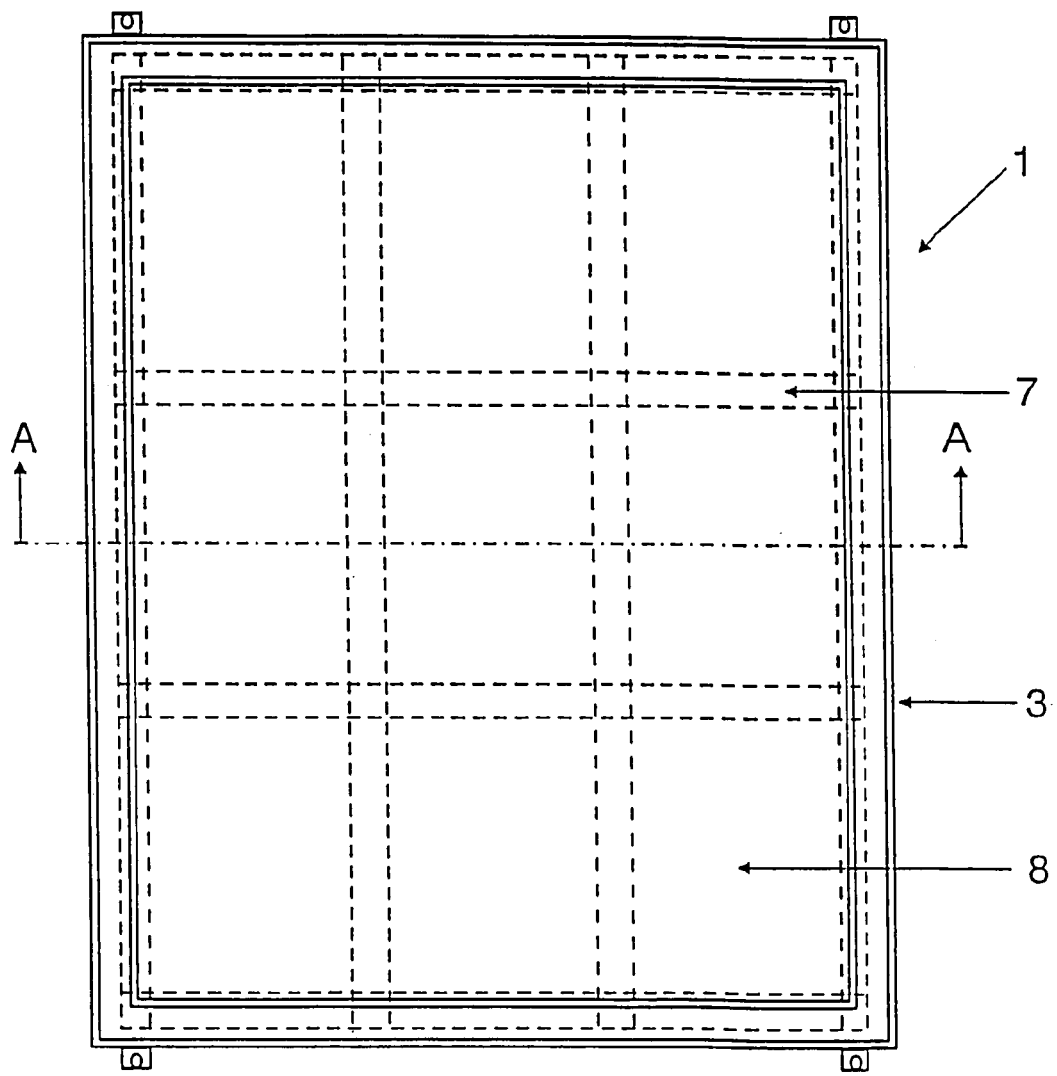
FIG. 1a shows a plan view of the illumination system according to the invention having a housing and a flat lamp arranged therein.

Reference will be made below to FIG. 1a-1c, which show, schematically, a plan view, a cross-sectional illustration along the line AA and an enlarged view of the detail X of an illumination system 1 according to the invention, which is provided for backlighting liquid crystal displays (LCDs) (backlight unit). The illumination system 1 essentially comprises a housing 2, which is open at one end, and a frame 3, both made of aluminum, and a flat lamp 4, of the dielectric barrier discharge lamp type. The housing 2 comprises a rear wall 5, which is enclosed by perpendicular side walls 6. The flat lamp 4 is fixed within the housing 2 on the rear wall 5 of said housing 2 with the aid of thin, elastic, double-sided adhesive bearing strips 7. The bearing strips 7 (for example "double coated foam tapes" by 3M), having a thickness of approximately 1 to 2 mm, extend, on the one hand, along the edge of the rear side of the flat lamp 4. On the other hand, four bearing strips 7 are arranged such that they are evenly distributed in the form of a grid on the rear side of the flat lamp 4. In this manner, a total of nine imaginary sections of the lamp rear side are enclosed by the bearing strips 7 (see FIG. 1a), which, together with the rear wall 5, form flat chambers 8. The frame 3, which is rectangular in its basic form, comprises four outer walls 9 and thus four inner walls 10, which are each connected at an angle and whose outer sides are formed as reflector surfaces 11. In the enlarged sectional illustration in FIG. 1c, the frame 3 has an angled profile, which is similar to a "V". The frame 3 is plugged onto the housing 2 such that the outer walls 9 of the frame 3 surround the side walls 6 of the housing 2 in a force-fitting manner. As a result, the inner walls 10 of the frame 3 reach at an angle into the interior of the housing 2. A peripheral cellular rubber strip 12 is fitted to the underside of the inner walls 10 of the frame 3 and is formed such that it reaches around the edge of the flat lamp 4 in an interlocking manner. In the manner explained above, the flat lamp 4 is reliably positioned between the frame 3 and the rear wall 5 of the housing 2 such that it is secure against breakage.

Figure 2:
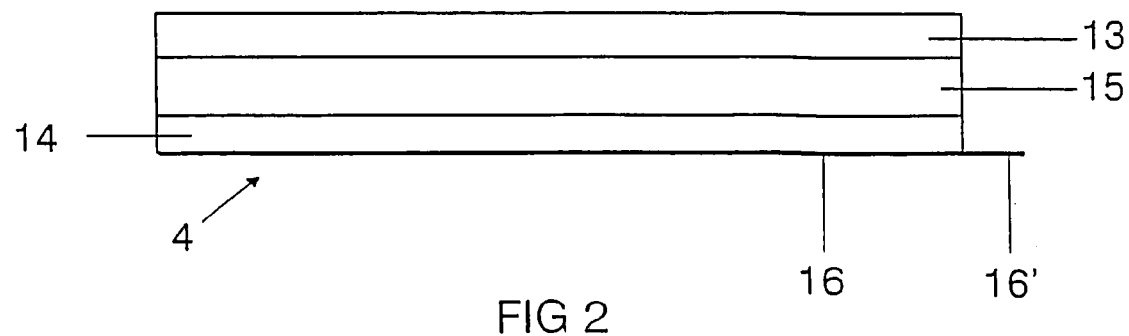
FIG. 2 shows the flat lamp from the illumination system illustrated in FIG. 1a-1c.

For further explanation of the flat lamp 4, which is illustrated only very roughly and without any details in the schematic sectional illustration in FIG. 1c, reference will be made below to the side view illustrated in FIG. 2.

The discharge vessel of the flat lamp 4, which has a diagonal of 21.31" and a side ratio of 4:3, is formed by a front plate 13, a base plate 14 and a discharge vessel frame 15, arranged therebetween, the discharge vessel frame 15 connecting the two plates 13, 14 to one another in a gas-tight manner. In order to achieve heat conduction which is as effective as possible away from the flat lamp and toward the rear wall of the housing, it is advantageous if the base plate 14 is as thin as possible.

Alternatively, it is also possible to dispense with a frame if the base and front plate are not both fully planar, but are formed at least in the edge region such that the frame is, as it were, integrated in at least one of the two plates, for example by the front plate being corrugated (not illustrated). Moreover, this variant has the advantage that the base plate can be made to be particularly thin without any problems as regards the stability of the discharge vessel, which, as has already been mentioned, is advantageous for effective heat conductance in the direction of the rear wall of the housing. For further details in relation to this, reference is made to the specifications U.S. Pat. No. 5,994,849 and WO 03/017312.

Found in the interior of the discharge vessel of the flat lamp 4 are xenon and neon having a partial filling pressure of approximately 10 kPa and approximately 20 kPa, respectively. A laminate 16 is adhesively bonded to the outer side of the thin base plate 14. A projection 16', which is not adhesively bonded, of the laminate 16 acts as a flexible power supply line (for details see FIG. 3). The outermost layer of the laminate 16 forms a carrier foil which is made of PET (polyester) and is approximately 50 µm thick and which at the same time serves as a protective foil for electrode tracks, which are approximately 15 µm thick and are made of copper and which lie above said protective foil (for details see FIG. 3). Thereupon there is finally an acrylic adhesive layer which is approximately 80 µm thick and by means of which the laminate 16 is adhesively bonded to the outer side of the base plate 14.

Figure 3:
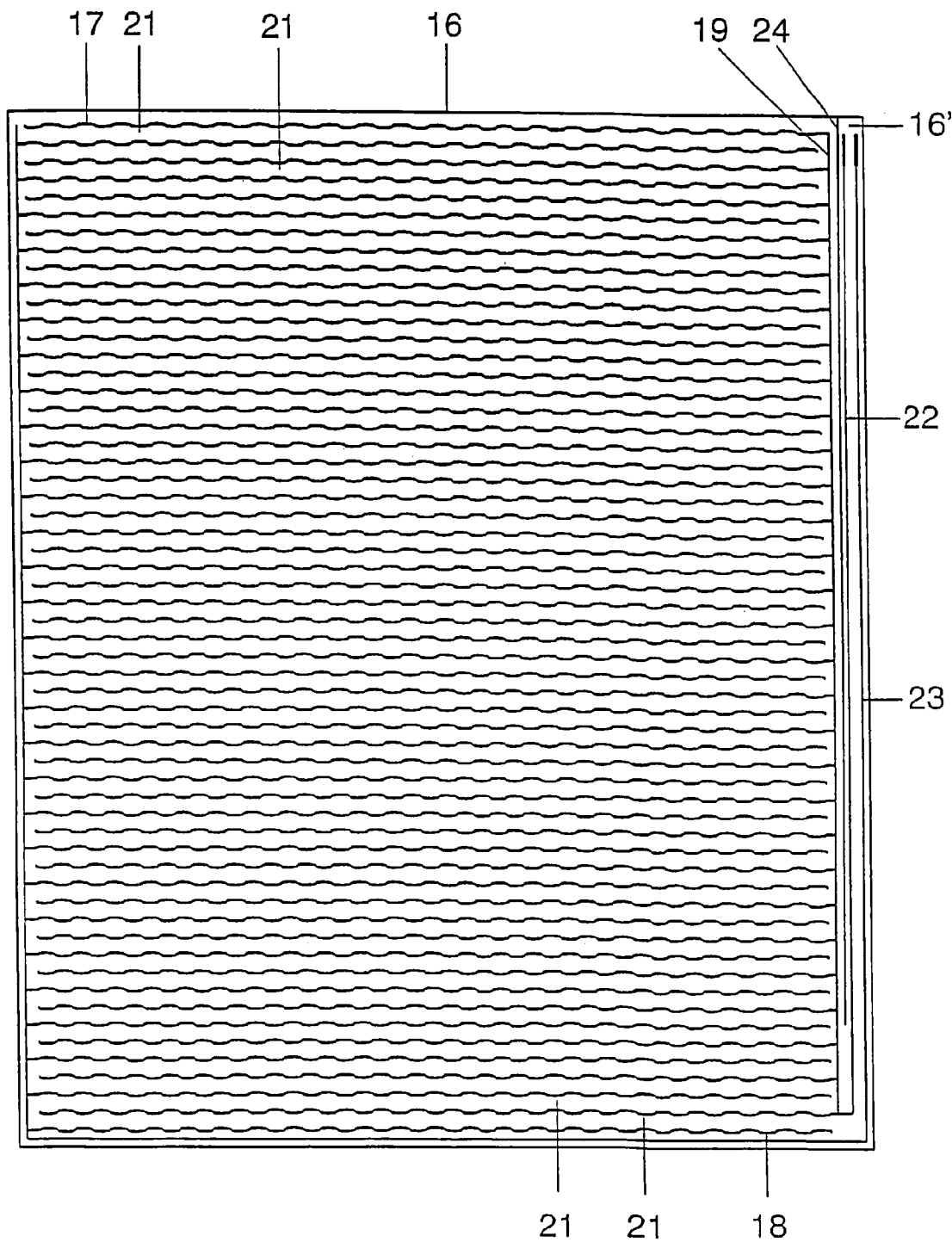
FIG. 3 shows the electrodes/protective foil laminate which is adhesively bonded to the rear side of the flat lamp shown in FIG. 2.

FIG. 3 shows a plan view of the copper-layer side of the laminate 16, which has been adhesively bonded to the outer side or the base plate 14 of the flat lamp 4. The copper-layer side comprises, in detail, 29 electrode tracks 17, which are arranged parallel and next to one another and at a mutual spacing from one another and which are provided for a first polarity and the same 29 electrode tracks 18, which are provided for a second polarity, an electrode track 17 of the first polarity continuing to alternate with an electrode track 18 of the second polarity. The respective one end of each electrode track 17, 18 of one polarity is combined on opposing sides to form a collective track 19, 20. In this manner, the electrode tracks 17, 18 form, with their associated collective tracks 19, 20, comb-like structures, the structures of the two polarities engaging in one another, as it were. The individual electrode tracks 17, 18, which are essentially straight, have substructures which are corrugated in the opposite direction, as a result of which, in each case between two immediately adjacent electrode tracks 17, 18, a large number of narrow points 21 are formed. At each of these points 21, during the pulsed operation mentioned initially in accordance with the above-cited U.S. Pat. No. 5,604,410, an individual discharge is formed within the discharge vessel (not shown). This electrode layout is suitable in particular also for the abovementioned flat lamp variant having a corrugated front plate in accordance with WO 03/017312.

Since the carrier foil of the adhesively bonded laminate 16 is the outer side of the rear side of the flat lamp 4, i.e. at the same time acts as an electrically insulating protective foil, the flat lamp 4 can in principle be arranged directly on the rear wall 5 of the housing 2 without there being the risk of an electrical short circuit between the outer electrodes 17, 18 via the metallic rear wall 5 or without the relatively high voltages across the electrodes resulting in electrical flashovers between the electrodes and the rear wall 5 during pulsed operation. The vicinity, which is thus possible, of the flat lamp 4 to the rear wall 5 of the housing 2 promotes, during operation, the dissipation of heat to the outside, as regards the heat losses produced both during operation in the interior of the flat lamp and in the outer electrodes 17, 18. To support this, it may also be helpful to blacken the outer side of the rear wall 5 in order thus to increase the emission coefficient.

In addition, a diffuser plate 25 is also arranged on the frame 3 in order to homogenize further still the luminance produced by the flat lamp 4 on its front side. The degree of homogenization and the level of luminance may be influenced by the spacing between the diffuser plate 25 and the front side of the flat lamp 4. For this purpose, for example, the frame 3 is pushed to a greater or lesser extent onto the side walls 6 of the housing 2. In addition, in this case the beveled inner walls 10 of the frame 3 must then be adapted correspondingly.

What is claimed is:

1. An illumination system, comprising:
   a flat lamp, which has a front side, provided for emitting the light, and a rear side opposite said front side,
   a flat housing having a planar rear wall and four side walls, the flat lamp being arranged within the housing on the rear wall,
   a thin, elastic, bearing being arranged between the rear side of the flat lamp and the rear wall of the housing, the thin, elastic bearing being in the form of double-sided adhesive strips, by means of which the flat lamp is adhesively bonded to the rear wall of the housing, and
   a frame, which, on the one hand, at least partially surrounds the side walls of the housing, and, on the other hand, extends at least up to the edge of the flat lamp.

2. The illumination system as claimed in claim 1, the frame overlapping the edge of the flat lamp.

3. The illumination system as claimed in claim 2, a peripheral, elastic strip extending between the frame and the edge of the flat lamp.

4. The illumination system as claimed in claim 3, the peripheral, elastic strip fixing the flat lamp by means of an interlocking connection.

5. The illumination system as claimed in claim 1, the frame having a peripheral surface, which adjoins the flat lamp and is designed as a reflector, in particular for visible light.

6. The illumination system as claimed in claim 5, the reflector surface of the frame being inclined toward the front side of the flat lamp.

7. The illumination system as claimed in claim 1, the adhesive strips being arranged parallel to one or to both of the side edges of the rear side of the flat lamp such that they are evenly distributed, with the result that the adhesive strips divide the rear side of the flat lamp into imaginary areas of equal size.

8. The illumination system as claimed in claim 1, the flat lamp being designed for operation by means of dielectrically impeded discharge.

9. The illumination system as claimed in claim 8, linear outer electrodes being fitted to the rear side of the flat lamp.

10. The illumination system as claimed in claim 9, the rear side of the flat lamp including the linear outer electrodes being covered by an electrically insulating protective layer.

11. The illumination system as claimed in claim 9, the outer electrodes being integrated in a foil-like laminate.

12. The illumination system as claimed in claim 1, the outer side of the rear wall of the housing being blackened.

13. The illumination system as claimed in claim 1, a diffuser plate being arranged on the frame.

* * * * *